Figure 1A:
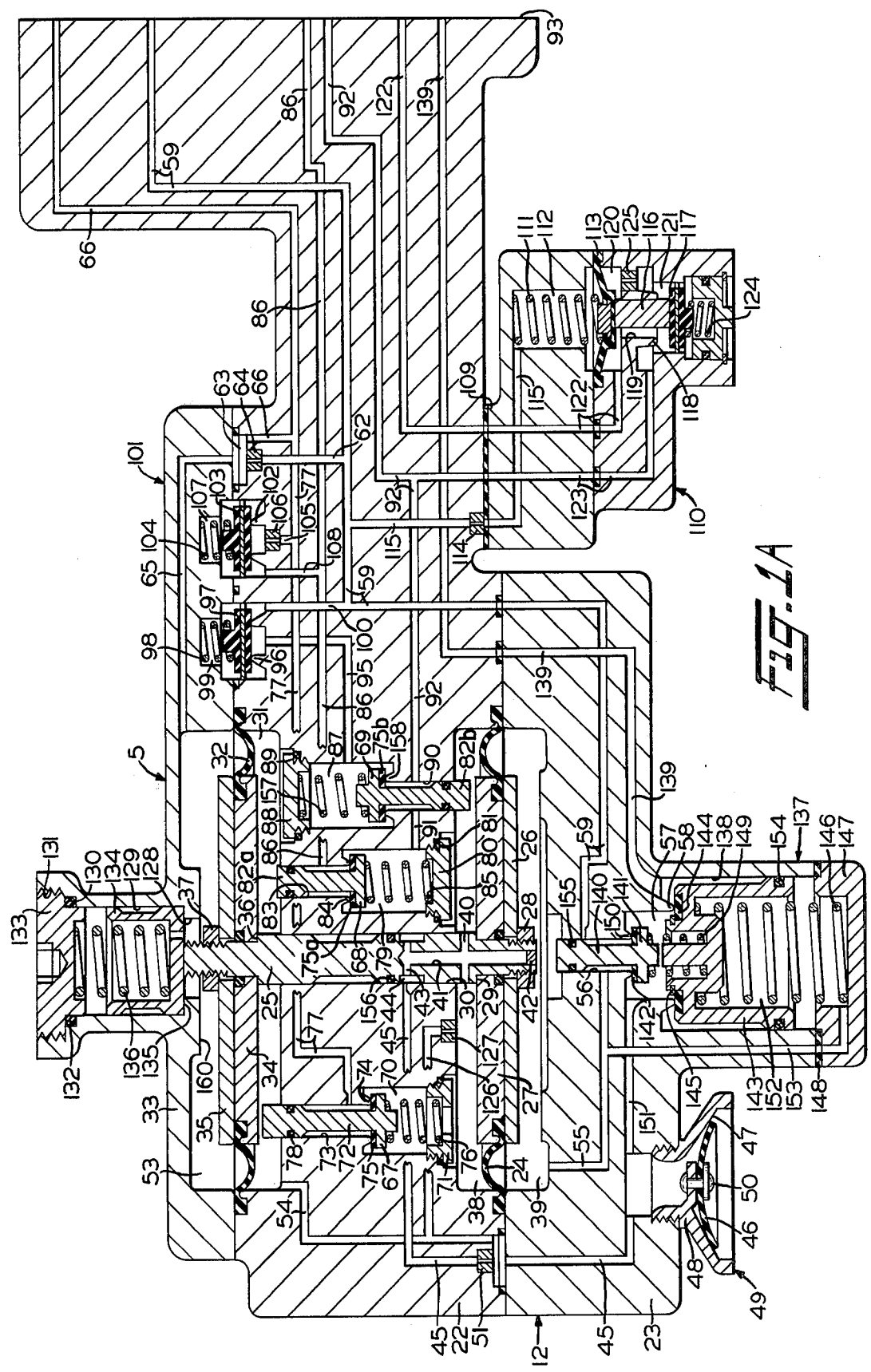

United States Patent [19]
Zoric

[11] 4,113,319
[45] Sep. 12, 1978

[54] EMERGENCY PORTION FOR A BRAKE CONTROL VALVE

[75] Inventor: Michael T. Zoric, North Versailles, Pa.

[73] Assignee: Westinghouse Air Brake Company, Wilmerding, Pa.

[21] Appl. No.: 749,288

[22] Filed: Dec. 10, 1976

[51] Int. Cl.² .............................................. B60T 15/44
[52] U.S. Cl. ...................................... 303/37; 303/80; 303/82; 303/85
[58] Field of Search .................... 303/35, 36, 37, 38, 303/39, 46, 80, 81, 82, 85, 86

[56] References Cited

U.S. PATENT DOCUMENTS

| | | | |
|---|---|---|---|
| 2,106,491 | 1/1938 | Sexton | 303/46 |
| 2,830,850 | 4/1958 | McClure et al. | 303/35 |
| 2,836,466 | 5/1958 | Cook | 303/35 |
| 2,905,508 | 9/1959 | Rush | 303/85 |
| 2,994,565 | 8/1961 | McClure et al. | 303/82 |
| 3,706,480 | 12/1972 | Washbourn | 303/69 X |
| 3,988,044 | 10/1976 | Hill | 303/82 |
| 4,045,095 | 8/1977 | Temple | 303/37 |

Primary Examiner—George E. A. Halvosa
Attorney, Agent, or Firm—W. F. Poore; R. W. McIntire, Jr.

[57] ABSTRACT

An upgraded railway freight car brake control valve device comprises a novel emergency valve portion that embodies therein a plurality of simple and inexpensive poppet valves and a spool-type valve which valves replace yet perform the same functions heretofore performed by more expensive slide-type valves which slide valves, and the flat seats upon which they slide as they are shifted from one position to another, in their manufacture require a considerable amount of accurate machining thus increasing the cost of the brake control valve device of which they are an important part.

14 Claims, 3 Drawing Figures

EMERGENCY PORTION FOR A BRAKE CONTROL VALVE

BACKGROUND OF THE INVENTION

In the copending application of Fred Temple, Ser. No. 699,624, filed June 25, 1976, now U.S. Pat. No. 4,045,095, and assigned to the assignee of the present application, there is shown and described a novel emergency valve portion that embodies therein four poppet valves that are disposed between and operated by a pair of spaced-apart movable abutments that are connected by a stem that operates a fifth poppet valve which effects the release of fluid under pressure from one side of a brake pipe vent valve that is thereupon unseated by brake pipe pressure acting on the opposite side to cause the release of fluid under pressure from a train brake pipe at an emergency rate. It is apparent that the manufacturing cost of this emergency valve portion is in direct proportion to the number of poppet-type valves embodied therein.

Accordingly, it is the general purpose of this invention to provide a railway car brake control valve device with a novel emergency valve portion that embodies therein a lesser number of poppet valves than is required in the emergency valve portion of the brake control valve device disclosed in the above-mentioned copending patent application of Fred Temple.

SUMMARY OF THE INVENTION

According to the present invention, a railway freight car brake control valve device that includes a service valve portion and a pipe bracket which are substantially the same as the service valve portion and pipe bracket shown in U.S. Pat. No. 3,232,678, issued Feb. 1, 1966 to William G. Wilson, and assigned to the assignee of the present application, and a novel emergency valve portion which is secured to this pipe bracket whereby this emergency valve portion in cooperation with the service valve portion and pipe bracket constitute an upgraded brake control valve device.

Figure 1B:
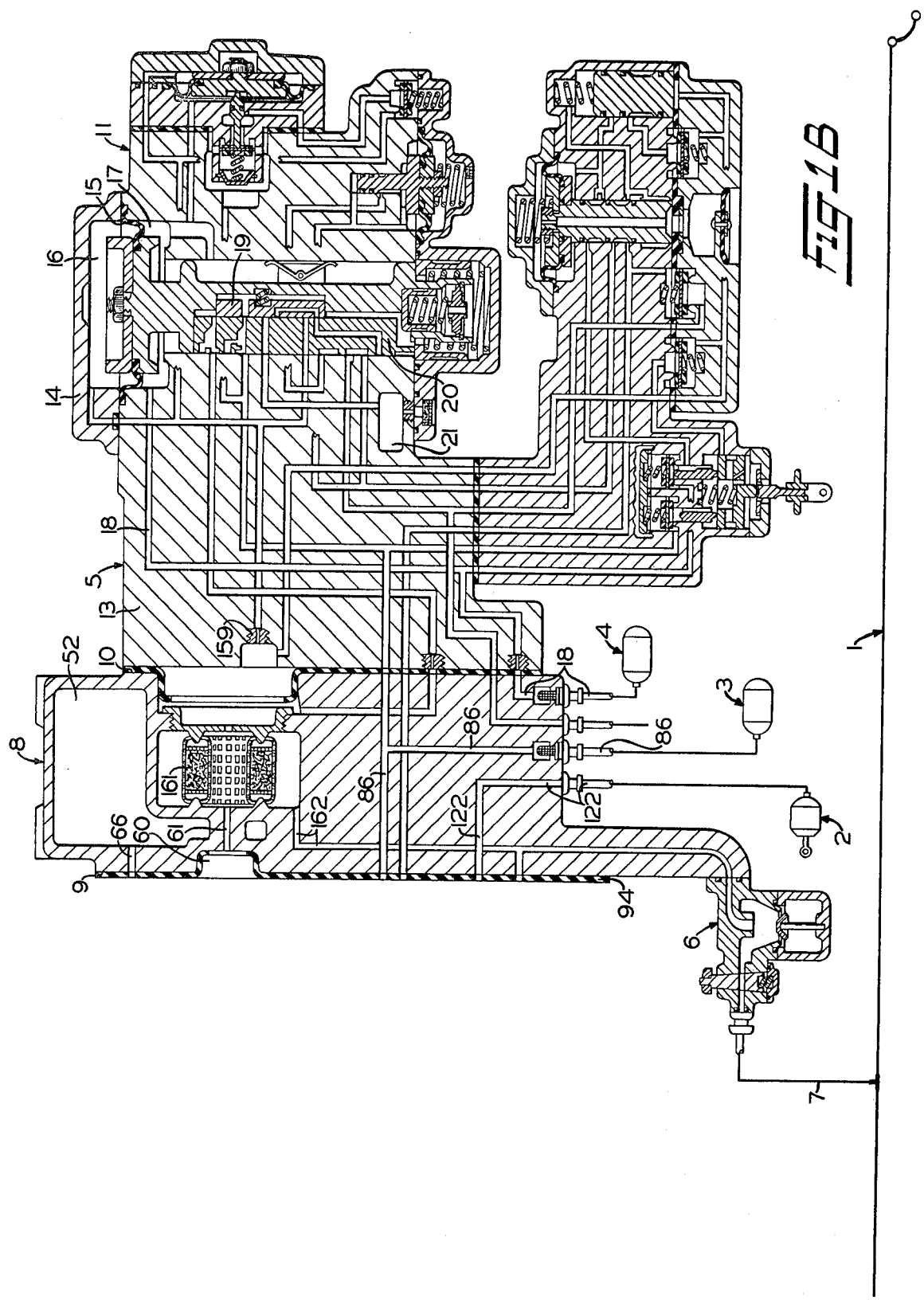

In the accompanying drawings:

FIG. 1A and FIG. 1B, taken together, constitute a diagrammatic view, in section, of an improved brake control valve device wherein the emergency valve portion shown in FIG. 1A is constructed in accordance with a first embodiment of the invention.

Figure 2:
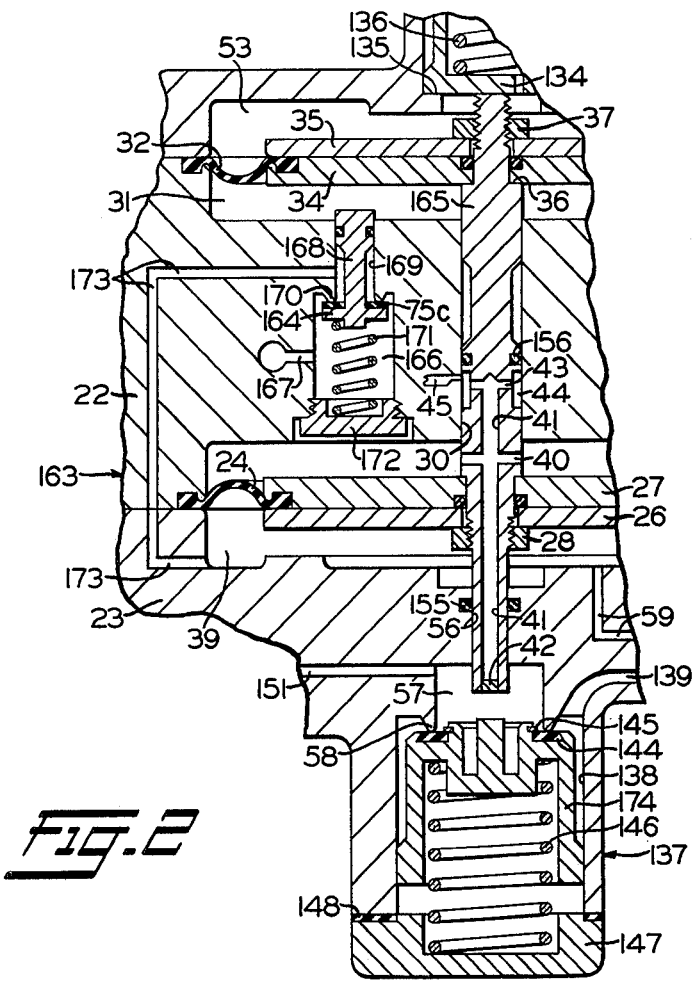

FIG. 2 is a partial diagrammatic view, in section, of an emergency valve portion constructed in accordance with a second embodiment of the invention.

DESCRIPTION — FIGS. 1A AND 1B

As shown in FIGS. 1A and 1B of the drawings, when the right-hand edge of FIG. 1A is placed along side of the left-hand edge of FIG. 1B, an improved freight car fluid pressure brake apparatus constituting a first embodiment of the invention comprises a brake pipe 1 that extends from one end of the car to the other, a brake cylinder 2, an emergency reservoir 3, an auxiliary reservoir 4, and a brake control valve device 5 connected to the brake pipe 1 through a combined cut-out cock and centrifugal dirt collector 6 and a branch pipe 7.

The brake control valve device 5 may comprise a pipe bracket 8 having gasket faces 9 and 10 disposed opposite each other and further comprising a service or triple valve device or portion 11 and a novel emergency valve device or portion 12.

The service valve portion 11 and pipe bracket 8 shown in FIG. 1B of the drawings may be substantially the same in construction and operation as the service valve portion 7 and pipe bracket 6 shown and described in the above-mentioned U.S. Pat. No. 3,232,678. Since reference may be had to this patent for a complete description of the structure and operation of this service valve portion and pipe bracket, it is deemed unnecessary to describe them in detail therein. Briefly, however, the service valve portion 11 comprises a sectionalized casing 13 between which and a cover member 14, secured thereto by any suitable means (not shown), is clamped the outer periphery of a diaphragm 15 subject opposingly on its opposite sides to brake pipe pressure in a chamber 16 at the upper side of this diaphragm 15, and to the pressure in the auxiliary reservoir 4 connected to a chamber 17 at the lower side of this diaphragm 15 by a pipe and correspondingly numbered passageway 18 that extends through the pipe bracket 8 and the sectionalized casing 13. Operatively connected to the diaphragm 15 is a service graduating valve 19 and a service slide valve 20 for, respectively, controlling the release of fluid under pressure from the brake pipe 1 to a quick service volume 21 and the supply of fluid under pressure from the auxiliary reservoir 4 to the brake cylinder 2 in response to variations in brake pipe pressure, as disclosed in the above-mentioned U.S. Pat. No. 3,232,678.

The novel emergency portion 12 shown in FIG. 1A of the drawings has a sectionalized casing comprising an upper casing section 22 and a lower casing section 23 secured thereto by any suitable means (not shown). A first annular diaphragm 24 has its outer periphery clamped between these casing sections 22 and 23.

The inner periphery of the diaphragm 24 is operatively connected to the lower end of a stem 25 that extends through coaxial bores in a pair of diaphragm follower plates 26 and 27 and is provided with screw threads adjacent its lower end for receiving a nut 28 which serves, when tightened, to force the follower plate 27 against a shoulder 29 on the stem 25 and clamp the inner periphery of the diaphragm between the diaphragm follower plates 26 and 27.

As shown in FIG. 1A, the stem 25 extends upward through a bore 30 provided therefor in the casing section 22 and into a chamber 31 formed by the cooperative relationship of the casing section 22 and a second annular diaphragm 32, the outer periphery of which is clamped between the casing section 22 and a cover member 33 secured to this casing section by any suitable means (not shown).

The inner periphery of the diaphragm 32 is operatively connected to the upper end of the stem 25 in that it is clamped between a pair of diaphragm follower plates 34 and 35 that are provided with coaxial bores through which the stem 25 extends. This stem 25 is provided adjacent its upper end with a second shoulder 36 and external screw threads for receiving a nut 37 which serves, when tightened, to force the follower plate 34 against the shoulder 36 and clamp the inner periphery of diaphragm 32 between the plates 34 and 35.

As may be seen from FIG. 1A, the diaphragm 24 and follower plates 26 and 27 cooperate with the casing sections 22 and 23 to form on the respective opposite sides of this diaphragm a pair of chambers 38 and 39.

The chamber 38 is normally open to atmosphere via a first crossbore 40 in the stem 25, a bottomed bore 41 extending into this stem from the lower end thereof and having its outer end closed by a plug 42, a second crossbore 43 in the stem 25 which crossbore connects the upper end of the bottomed bore 41, as viewed in FIG. 1A, to an elongated peripheral annular groove 44 formed on this stem 25, a passageway 45 that extends through the casing sections 22 and 23 and past a dished circular shield 46.

The shield 46 is preferably formed of a resilient material, such as rubber, and is held in place, in which its outer periphery rests against a conical inner surface 47 on a screw-threaded body 48 of an insect excluder device 49, by any suitable means, such as, for example, a rivet 50 that extends through a bore in the body 48.

A choke 51 is disposed in the passageway 45 to control the rate at which fluid under pressure is released from a quick action chamber 52 (FIG. 1B) to atmosphere when a service brake application is effected and in actual practice, as in heretofore constructed railway freight car brake control valve devices, has a diameter of 0.0810 inch, it being understood that when the diameter of this choke 51 is 0.0810 inch, fluid under pressure will be released from the quick action chamber 52 and a chamber 53 above the diaphragm 32, in a manner hereinafter explained, at the same rate as fluid under pressure is being released from the brake pipe 1 and the chamber 39 below the diaphragm 24 via a pathway hereinafter described.

Likewise, the chamber 31 below the diaphragm 32 is open to atmosphere via a passageway 54 in the casing 22 that at one end opens into the chamber 31 and at the other into the passageway 45 on the downstream side of the choke 51 which passageway 45 is open to atmosphere, as explained above.

As shown in FIG. 1A, opening into the chamber 39 below the diaphragm 24 is one end of a passageway 55 that extends through the casing section 23 and opens at the wall surface of a bore 56 that at its upper end opens into the chamber 39 and at its lower end into an annular chamber 57 in the casing section 23. At the lower end of chamber 57, the casing section 23 is provded with an annular valve seat 58.

Also, as shown in FIG. 1A, opening at the wall surface of the bore 56, at a location above the location at which one end of the passageway 55 opens at this wall surface, is one end of a passageway 59 that extends through the casing sections 23 and 22 and at its other end opens into a chamber 60 (FIG. 1B) formed in the pipe bracket 8. Furthermore, opening into the chamber 60 is one end of a passageway 61 that is connected to the brake pipe 1 in the manner described in the hereinbefore-mentioned U.S. Pat. No. 3,232,678.

As can be seen from FIG. 1A, opening into the passageway 59 intermediate the ends thereof is one end of a passageway 62 that extends through the casing section 22 and at its opposite end opens into a chamber 63 formed between the casing section 22 and cover member 33. A choke 64 carried by the casing section 22 and disposed in the upper end of the passageway 62 controls the rate of flow of fluid under pressure from the passageway 62 to the chamber 63 into which opens one end of a first passageway 65 that extends through the cover member 33 and opens at its other end into the chamber 53 above the diaphragm 32.

Also opening into the chamber 63 is one end of a second passageway 66 that extends through the casing section 22 and the pipe bracket 8 (FIG. 1B) and opens at its opposite end into the hereinbefore-mentioned quick action chamber 52 formed in this pipe bracket. From the foregoing, it is apparent that the quick action chamber 52 is charged with fluid under pressure from the brake pipe 1 via the choke 64 which in actual practice, or, in other words, in heretofore constructed railway freight car brake control valve devices, has a diameter of 0.0200 inch.

As shown in FIG. 1A of the drawings, the casing section 22 embodies therein three poppet-type valves 67, 68 and 69, it being noted that the valves 68 and 69 are identical and, therefore, interchangeable thereby enabling a railroad company to carry in its storerooms one spare part item instead of two, as would be the case were the valve 68 and 69 not identical.

The poppet-type valve 67 is disposed in a chamber 70 that is formed in the casing section 22 and connected to the atmospheric chamber 38 by a ported screw-threaded plug 71 that has screw-threaded engagement with screw threads provided threfor in the casing section 22.

The poppet valve 67 has formed integral with one side thereof a fluted valve stem 72 that extends through a bore 73 provided therefor in the casing section 22 and connecting the chambers 70 and 31, it being noted that an annular valve seat 74 surrounds the lower end of this bore 73.

A resilient annular member 75 constructed of, for example, rubber, is disposed about the stem 72 and bonded to the upper side of the poppet valve 67, and a spring 76 interposed between the plug 71 and the lower side of this poppet valve 67 is effective to normally bias the annular member 75 against the valve seat 74 to close communication between the chamber 70 and the interior of the bore 73 at the wall surface of which opens one end of a passageway 77 that extends through the casing section 22 and at its other end opens into the passageway 66 intermediate the ends thereof.

Intermediate the fluted portion of valve stem 72 and its upper end, this valve stem 72 is provided with a peripheral annular groove in which is disposed an O-ring seal 78 that forms a seal with the wall surface of the bore 73 to prevent flow of fluid under pressure from the passageway 77 to the chamber 31 which is always open to atmosphere via the passageway 54 and 45 and past the resilient shield 46.

Since the poppet valves 68 and 69 are identical, the parts of these poppet valves 68 and 69 are denoted by the same reference numerals with the addition of the letter a for the parts of valve 68 and b for the corresponding parts of the valve 69.

The poppet valve 68 is disposed in a chamber 79 that is formed in the casing section 22 and separated from the atmospheric chamber 38 by a screw-threaded plug 80 and an O-ring seal 81.

The poppet valves 68 and 69 have formed integral with one side thereof fluted valve stems 82a and 82b, respectively. This stem 82a of the valve 68 extends through a bore 83 provided therefor in the casing section 22 and connecting the chambers 79 and 31, it being noted that an annular valve seat 84 surrounds the lower end of this bore 83.

Resilient annular members 75a and 75b are disposed about the respective valve stems 82a and 82b, as the annular member 75 is disposed about the valve stem 72 of the valve 67, and are bonded to the respective poppet valve 68 and 69.

A spring 85 interposed between the plug 80 and the lower side of the poppet valve 68 is effective to normally bias the annular member 75a against the valve seat 84 to close communication between the chamber 79 and the interior of the bore 83 at the wall surface of which opens one end of a passageway 86. As shown in FIGS. 1A and 1B, this passageway 85 extends through the casing section 22 and pipe bracket 8 and is connected by a correspondingly numbered pipe to the emergency reservoir 3.

Finally, the poppet-type valve 69 is disposed in still another chamber 87 provided in the casing section 22, this chamber 87 being separated from the atmospheric chamber 31 by a screw-threaded plug 88 and an O-ring seal 89.

As may be seen from FIG. 1A, the valve stem 82b of the poppet-type valve 69 is disposed in a bore 90 that extends through the casing section 22 from the chamber 87 to the chamber 38. Opening at the wall surface of the bore 90 at diametrically opposite locations intermediate the ends of this bore is one end of a pair of passageways 91 and 92. The passageway 91 extends through the casing section 22 and opens into the chamber 79, and the passageway 92 extends through the casing section 22 to a gasket face 93 formed on the right-hand end of the casing section 22. A ported gasket 94 is disposed between the gasket face 93 on the casing section 22 and the gasket face 9 (FIG. 1B) on the pipe bracket 8. Consequently, one of the ports in this gasket 94 establishes a communication between the passageway 92 in the casing section 22 and a passageway in the pipe bracket 8 that corresponds to the passageway 72 shown in the hereinbefore-mentioned U.S. Pat. No. 3,232,678. As explained in this patent, fluid under pressure is supplied from the auxiliary reservoir 2 (in the patent) whenever a service brake application is effected. Accordingly, it is apparent that, likewise, fluid under pressure is supplied from the auxiliary reservoir 4 (FIG. 1B) to the passageway 92 (FIG. 1A), interior of bore 90, passageway 91 and chamber 79 by operation of the service portion 11 (FIG. 1B) in response to a reduction of the pressure in the brake pipe 1 at a service rate.

As shown in FIG. 1A, opening into the chamber 87 is one end of a passageway 95 that extends through the casing section 22 and opens at its other end within an annular valve seat 96 against which a check valve 97 is normally biased by a spring 98 interposed between the upper side of this check valve and the cover member 33 to close communication between the passageway 95 and a chamber 99 formed between the casing section 22 and cover member 33. Opening into the chamber 99 is one end of a passageway 100 that extends through the casing section 22 and at its opposite end opens into the passageway 59 intermediate the ends thereof.

In the event that the pressure in the quick action chamber 52 becomes higher than that in the emergency reservoir 3, a check valve device 101 is provided. As shown in FIG. 1A, this check valve device 101 comprises an annular valve seat 102 against which a flat disc valve 103 is normally biased by a spring 104 that is interposed between this disc valve 103 and the cover member 33. Opening within the annular valve seat 102 is one end of a short passageway 105 that extends through the casing section 22 and at its opposite end opens into the hereinbefore-mentioned passageway 77. A choke 106 is disposed in this passageway 105 to control the rate of flow of fluid under pressure from the passageway 77, which is connected to the quick action chamber 52 by the passageway 66, to a chamber 107 above the disc valve 103 into which chamber 107 opens one end of a passageway 108 that extends through the casing section 22 and at its other end opens into the hereinbefore-mentioned passageway 86 that is connected to the emergency reservoir 3 by the correspondingly numbered pipe, as shown in FIG. 1B.

As shown in FIG. 1A, the casing section 22 is provided with a flat bolting face 109 against which is secured, by any suitable means (not shown), an inshot valve mechanism 110 which is operative, when effecting an emergency application of the brakes, to provide an initial inshot of fluid under pressure to the brake cylinder 2 (FIG. 1B) until a predetermined brake cylinder pressure (about fifteen pounds per square inch) is developed and to then restrict the rate of flow of fluid under pressure to the brake cylinder 2.

The inshot valve mechanism 110 may be substantially the same as the inshot valve mechanism 52 shown and described in U.S. Pat. No. 2,106,491, issued Jan. 25, 1938 to Everette P. Sexton and assigned to the assignee of the present invention. This inshot valve mechanism 110 shown in FIG. 1A of the present application differs from the inshot valve mechanism 52 shown in U.S. Pat. No. 2,106,491 by the addition of a spring 111 disposed in a chamber 112 above a diaphragm 113 and a choke 114 disposed in a passageway 115 that at one end opens into the chamber 112 and at its other end opens into the hereinbefore-mentioned passageway 59 that is connected to the brake pipe 1.

Briefly, the force of the spring 111 and brake pipe pressure in the chamber 112 acting on the diaphragm 113 is normally effective, via a fluted stem 116, to unseat a disc valve 117 from an annular valve seat 118 formed at the lower end of a bore 119.

While the valve 117 is unseated from the seat 118, the bore 119 provides an unrestricted communication between a chamber 120 below the diaphragm 113 and a chamber 121 in which is disposed the disc valve 117. The chamber 120 is connected to the brake cylinder 2 (FIG. 1B) by a passageway and correspondingly numbered pipe 122, and the chamber 121 is connected to the hereinbefore-mentioned passageway 92 by a passageway 123.

When brake cylinder pressure in the chamber 120 is built up sufficiently to deflect the diaphragm 113 upward against the yielding resistance of the spring 111 and the brake pipe pressure in the chamber 112, a spring 124 is rendered effective to seat valve 117 on its seat 118 whereupon further flow of fluid under pressure to the brake cylinder 2 is at a restricted rate determined by the size of a choke 125 that provides a bypass communication between the chambers 121 and 120 while the valve 117 is seated on its seat 118. In actual practice, as in heretofore constructed railway freight car brake control valve devices, the choke 125 has a diameter of 0.09375 inch.

In order to control flow of fluid under pressure from the quick action chamber 52 to atmosphere when an emergency application of the brakes is effected, while flow from this chamber 52 to atmosphere via the choke 51 in the passageway 45 is cut off in a manner hereinafter described, the casing section 22 has provided therein a passageway 126 that at one end opens into the hereinbefore-mentioned passageway 54 intermediate the ends thereof, it being remembered that this passageway 54 is open to atmosphere via the portion of the passageway 45 on the donwstream side of the choke 51 and past the resilient shield 46. The opposite end of this passageway 126 opens into the chamber 38 above the diaphragm 24 via a choke 127 disposed in this passageway. In actual practice, as in heretofore constructed railway freight car brake control valve devices, the choke 127 has a diameter of 0.0200 inch.

Referring to FIG. 1A, it will be noted that the cover member 33 is provided with a bore 128 that is coaxial with the bore 30 in the casing section 22 and three coaxial counterbores 129, 130 and 131, this latter counterbore 131 being provided with internal screw threads. An O-ring seal 132 is retained in the counterbore 130 by a screw-threaded plug 133 having screw-threaded engagement with the screw-threaded counterbore 131, and a cup-shaped piston 134 slidably mounted in the counterbore 129 is normally biased against a shoulder 135 formed by the lower end of this counterbore 129 by a spring 136 interposed between this piston 134 and the plug 133. This spring 136 and piston 134 yieldingly resist upward deflection of the diaphragms 32 and 24 in a manner hereinafter described.

The emergency valve device 12 shown in FIG. 1A further comprises a brake pipe vent valve device 137 for effecting a rapid release of fluid under pressure from the brake pipe 1 to atmosphere whenever an emergency brake application is effected.

As shown in FIG. 1A, the casing section 23 is provided with a counterbore 138 that is coaxial with the bore 56 and into the upper end of which, on the outside of the annular valve seat 58, opens one end of a passageway 139. This passageway 139 extends through the casing sections 23 and 22 to the gasket face 93 on the casing section 22 where it registers with a port in the ported gasket 94. This port in the gasket 94 establishes a communication between the passageway 139 in the casing section 22 and a passageway in the pipe bracket 8 that corresponds to the passageway 37 shown in the hereinbefore-mentioned U.S. Pat. No. 3,232,678. As shown in FIG. 1 of this patent, fluid under pressure is supplied from the brake pipe to this passageway 37 (in the patent). Accordingly, it is apparent that fluid under pressure is supplied from the brake pipe 1 to the passageway 139 (FIG. 1A) and the counterbore 138.

Slidably mounted in the bore 56 is a fluted valve stem 140 that at its lower end is integral with a poppet-type vent valve pilot valve 141 that has a resilient annular valve member 142 bonded thereto in surrounding relation to the valve stem 140. Slidably mounted in the counterbore 138 is a cup-shaped vent valve guide 143. A vent valve 144 constructed of some resilient material, such as, for example, rubber, is clamped to the valve guide 143 by a snap ring 145. The vent valve 144 is normally biased against the valve seat 58 by a spring 146 that is interposed between the vent valve guide 143 and a lower cover member 147 that is secured by any suitable means (not shown) to the lower end of the casing section 23, there being a ported resilient gasket 148 disposed between this cover member and the casing section 23. A second spring 149 is interposed between the vent valve guide 143 and the vent valve pilot valve 141 to normally bias the annular valve member 142 against an annular valve seat 150 formed at the lower end of the hereinbefore-mentioned bore 56.

In order that the inner seated area of the vent valve 144 be normally subjected to atmospheric pressure, passageway 151 opens at one end into the chamber 57 and at the other end into the passageway 45 that is open to atmosphere via the resilient shield 46.

Moreover, in order that fluid under pressure may be supplied from the brake pipe 1 to a chamber 152 below the vent valve 144 to assist the spring 146 in maintaining this valve 144 seated on its seat 58, a passageway 153 opens at one end into the chamber 152 and at the other into the passageway 55 intermediate the ends thereof. It is apparent from FIG. 1A that the fluid under pressure supplied from the brake pipe 1 to the passageway 59 in the manner hereinbefore-described will flow from this passageway 59 to the chamber 152 via the bore 56, fluted stem 140, passageway 55 and passageway 153.

In order to prevent flow of fluid under pressure from the passageway 139 and counterbore 138 to the chamber 152 when fluid under pressure is vented from this chamber to atmosphere in a manner hereinafter explained, the vent valve guide 143 is provided with a peripheral annular groove in which is disposed an O-ring seal 154 that forms a seal with the wall surface of the counterbore 138.

It may be noted from FIG. 1A that the stems 25 and 140 are each provided with a peripheral annular groove in which are disposed respectively O-ring seals 155 and 156 that form a seal with the wall surface of the respective bores 56 and 30 to prevent leakage of fluid under pressure from one end of each respective bore to the other.

It may be further noted from FIG. 1A that a spring 157 is interposed between the plug 88 and the poppet valve 69 to normaly bias the annular member 75b of this valve 69 against an annular valve seat 158 formed at the upper end of the bore 90 to close communication between the passageways 91 and 92 and the chamber 87.

OPERATION–FIGS. 1A AND 1B Initial Charging

Let it be assumed that a railway freight car provided with the brake control valve device 5 shown in FIGS. 1A and 1B of the drawings has been coupled into a train of cars, and that a handle of an engineer's brake valve device (not shown) located on the locomotive coupled to the head end of the train is in its release position. Therefore, while the handle of the engineer's brake valve device is in its release position, this brake valve device will effect the supply of fluid under pressure to the train brake pipe and, therefore, to the brake pipe 1 to charge the train brake pipe to a preselected normal charged value which, for example, may be seventy pounds per square inch.

Fluid under pressure supplied to the brake pipe 1 will flow via the branch pipe 7 and combined cut-out cock and dirt collector 6 to the brake control valve device 5 to cause the service valve portion 11 of this control valve device 5 to operate in the usual well-known manner of railway freight car brake control valve devices to effect a release of fluid under pressure from the brake cylinder 2 thereby releasing the brakes on the car and to charge the emergency reservoir 3 and auxiliary reservoir 4 to the pressure carried in the brake pipe 1.

Fluid under pressure supplied to the brake pipe 1 will flow therefrom to: (1) the interior of the counterbore 138 via the passageway 139, (2) the chamber 39 via the passageway 61, chamber 60 and passageways 59 and 55 and bore 56 and (3) the chamber 63 via the passageways 59 and 62 and choke 64.

Fluid under pressure thus supplied to the chamber 63 flows therefrom to the chamber 53 above diaphragm 32 via the passageway 65 at a restricted rate determined by the size of the choke 64. Fluid under pressure thus supplied to the chamber 63 also flows therefrom to the quick action chamber 52 (FIG. 1B) via the passageway 66 to effect the charging thereof to the normal pressure carried in the brake pipe 1.

It will be noted from FIG. 1A that some of the fluid under pressure supplied to the passageway 66 flows therefrom to the interior of the bore 73 via passageway 77.

Since the choke 64 restricts the rate of flow of fluid under pressure from the brake pipe 1 to the chamber 53 above the diaphragm 32, the unrestricted flow of fluid under pressure from the brake pipe 1 to the chamber 39 below the diaphragm 24 will cause the pressure to increase in the chamber 39 faster than in the chamber 53 above the diaphragm 32. Consequently, it is apparent that a differential fluid pressure force is established which acts in an upward direction to thereby deflect the diaphragms 24 and 32 upward and shift the diaphragm follower plates 26, 27, 34 and 35, stem 25 and piston 134 upward against the yielding resistance of the spring 136.

As the diaphragm follower plate 27 is thus shifted upward, it will first abut the lower end of the stem 82b of the poppet-type valve 69 and thereafter unseat the annular valve member 75b of this valve 69 from its seat 158.

Assuming that no fluid under pressure is present in the brake cylinder 2 (FIG. 1B) at the time the freight car is coupled into the train, there is no flow of fluid under pressure from this brake cylinder 2 to the brake pipe 1 upon unseating of the valve member 75b from the seat 158.

Subsequent to the pressure in the chamber 39 reaching the normal fully charged brake pipe pressure, the continued flow of fluid under pressure to the chamber 53 via the choke 64 will cause the pressure in this chamber 53 to increase to that in the chamber 39.

As the pressure in the chamber 53 is thus increased to that in the chamber 39, the spring 136 is rendered effective to shift the piston 134, stem 25, diaphragm follower plates 26, 27, 34 and 35 and diaphragms 32 and 29 downward until they are returned to the position in which they are shown in FIG. 1A.

As the diaphragm follower plate 27 is thus shifted downward, the spring 157 is rendered effective to seat annular valve member 75b of the poppet valve 69 on its seat 158.

SERVICE APPLICATION

A service application of the brakes is initiated by effecting a gradual reduction in brake pipe pressure at a service rate in the usual well-known manner. The service portion 11 (FIG. 1B) of the brake control valve device 5 will operate in the usual manner of the service portion of heretofore known railway freight car brake control valve devices to effect the supply of fluid under pressure from the auxiliary reservoir 4 to the brake cylinder 2 to cause a service brake application on the freight car provided with this control valve device 5.

As the pressure in the brake pipe 1 is reduced at a service rate, the pressure in the chamber 39 below the diaphragm 24 will be correspondingly reduced at a service rate.

Since the choke 64 restricts the rate of flow of fluid under pressure from the chambers 53 and 52 to the brake pipe 1, it is apparent that as the pressure in the chamber 39 below the diaphragm 24 is thus reduced faster than the pressure in the chamber 53 above the diaphragm 32, a differential fluid pressure force is established which acts in a downward direction to deflect diaphragms 32 and 24 downward and thereby effect shifting of stem 25 and diaphragm follower plates 26, 27, 34 and 35 downward.

As the diaphragm follower plate 34 is thus shifted downward, it will first abut the upper end of valve stem 72 of poppet valve 67 and thereafter shift this stem downward to unseat annular valve member 75 of this poppet valve 67 from its seat 74. It should be noted that this valve member 75 of the poppet valve 67 is unseated from its seat 74 without the diaphragm follower plate 34 effecting unseating of the valve member 75a of the poppet valve 68 from its seat 84 or the stem 25 effecting unseating of the annular valve member 142 of poppet valve 141 from its seat 150.

Upon the unseating of the annular valve member 75 of the poppet valve 67 from its seat 74, fluid under pressure will flow from the chamber 53 above diaphragm 32 and the quick action chamber 52 to atmosphere via the passageway 65, chamber 63, passageways 66 and 77, bore 73, past valve seat 74, chamber 70, ported plug 71, chamber 38, crossbore 40, bottomed bore 41, and crossbore 43 in and groove 44 on stem 25, passageway 45, choke 51 and thence past shield 46 of insect excluder device 49 at a rate determined by the size of the choke 51.

It may be noted that fluid under pressure may flow from the chamber 38 above the diaphragm 24 to atmosphere via the choke 127, passageways 126, 54 and 45 and thence past the shield 46 in parallel with the flow through the choke 51.

As hereinbefore stated, the diameter of the choke 51 may be 0.0810 inch, and the diameter of the choke 127 0.0200 inch. Since the diameter of the choke 51 is substantially larger than the diameter of the choke 127, the flow of fluid through the choke 127 at this time is so small as to be of little or no consequence.

Furthermore, it may be noted that the size of the choke 51 is sufficiently large to provide for the flow of fluid under pressure from the chamber 38 to atmosphere at such a rate that a pressure is not built up in this chamber 38 above the diaphragm 24 which is of sufficient magnitude as to effect further downward deflection of this diaphragm 24, diaphragm follower plates 26 and 27 and stem 25 to cause unseating of annular valve member 142 of vent valve pilot valve 141 from its seat 150 which would cause the vent valve device 137 to operate to release fluid under pressure from the train brake pipe at an emergency rate and thereby effect an undesired emergency brake application on the entire train.

The diameter of the choke 51 being 0.0810 inch, this diameter is such as to enable fluid under pressure to be released from the chamber 53 above the diaphragm 32 and the quick action chamber 52 (FIG. 1A) to atmosphere at the same rate as fluid under pressure is being released from the chamber 39 below the diaphragm 24. This enables the pressure differential on the diaphragms 32 and 24 to be substantially destroyed so that these diaphragms are not further deflected in a downward direction.

SERVICE LAP

When the release of fluid under pressure from the brake pipe is terminated, the release of fluid under pressure from the chamber 39 is likewise terminated.

As the flow of fluid under pressure from the chamber 53 and quick action chamber 52 to atmosphere continues, a differential fluid pressure force is established on the diaphragms 24 and 32 which acts in an upward direction. Consequently, these diaphragms 24 and 32 are deflected in an upward direction to shift the stem 25 and diaphragm follower plates 26, 27, 34 and 35 upward.

As the diaphragm follower plate 34 is thus shifted upward from the stem 72 of the poppet valve 67, the spring 76 is rendered effective to seat the annular valve member 75 of this poppet valve 67 on its seat 74 thereby terminating further flow of fluid under pressure from the chamber 53 and quick action chamber 52 to atmosphere.

When the release of fluid under pressure from the brake pipe 1 is terminated, the service valve device 11 will move to a lap position to cut off flow of fluid under pressure from the auxiliary reservoir 4 to the brake cylinder 2.

EMERGENCY APPLICATION

To effect an emergency application of the brakes, fluid under pressure is suddenly vented at a rapid rate from the brake pipe 1. Upon this reduction of pressure in the brake pipe 1, the service valve device 11 will operate to supply fluid under pressure from the auxiliary reservoir 4 (FIG. 1B) to the passageway 92 (FIG. 1A).

Moreover, the emergency valve device 12 operates in the manner explained above to release fluid under pressure from the chamber 53 and quick action chamber 52 to atmosphere via the choke 51. This rate of release of fluid under pressure from the chamber 53 above the diaphragm 32 is less than the emergency rate of release of fluid under pressure from the chamber 39 below the diaphragm 24 via the brake pipe 1.

Therefore, it is apparent that a differential of pressure is quickly established on the diaphragms 32 and 24 which acts in a downward direction to deflect these diaphragms downward and thereby shift the stem 25 and diaphragm follower plates 26, 27, 34 and 35 downward.

As the stem 25 is thus further shifted in a downward direction, the O-ring seal 156 carried by the stem 25 is moved downward with this stem to a position in which this O-ring seal 156 forms a seal with the wall surface of the bore 30 at a location that is below the location at which one end of the passageway 45 opens at this wall surface just prior to movement of the lower end of the stem 25 and plug 42 into abutting relationship with the upper end of the valve stem 140.

Thus, flow of fluid under pressure from the chamber 53 and quick action chamber 52 (FIG. 1B) to atmosphere via the choke 51 (FIG. 1A) is cut off just prior to unseating of the annular valve member 142 of the vent valve pilot valve 141 from its seat 150 to cause operation of the vent valve device 137.

Subsequent to this cut off of flow through the choke 51, the fluid under pressure supplied to the chamber 38 above the diaphragm 24 from the chamber 53 and quick action chamber 52 (FIG. 1B) may flow to atmosphere via the choke 127, the diameter of which, as hereinbefore stated, is 0.0200 inch, passageways 126, 54 and 45 and past the shield 46.

Since the diameter of the choke 51 is 0.0810 inch, as hereinbefore stated, it is apparent that, subsequent to downward shifting of the valve stem 25 to the above-mentioned position in which the O-ring seal 156 forms a seal with the wall surface of the bore 30 below the location at which the one end of the passageway 45 opens at this wall surface, the flow of fluid under pressure from the chamber 38 to atmosphere is at a much slower rate which causes a buildup of pressure in the chamber 38 above the diaphragm 24. This build up of pressure in the chamber 38 provides a fluid pressure force that acts in a downward direction on the diaphragm 24. Accordingly, it is apparent that this fluid pressure force acts in the same direction as the hereinbefore-mentioned differential fluid pressure force acting downward on the diaphragms 32 and 24. Consequently, this downwardly acting fluid pressure force on the diaphragm 24 assists this hereinbefore-mentioned differential fluid pressure force acting downwardly on the two diaphragms 24 and 32 in quickly deflecting these diaphragms downward and simultaneously shifting the stem 25 downward so that the lower end of this stem will first abut the upper end of the stem 140 and thereafter, via this stem 140, effect unseating of the annular valve member 142 of the poppet-type vent valve pilot valve 141 from its seat 150.

As the stem 140 is thus shifted downward by the stem 25, the O-ring 155 carried by this stem 140 is moved downward to a position in which it makes a seal with the wall surface of the bore 56 at a location that is below the location at which the end of the passageway 59 opens at this wall surface. Thus, communication between passageways 59 and 55 is cut off.

Upon the unseating of the annular valve member 142 from its seat 150, the fluid under pressure present in the chamber 152 below vent valve 144 will flow to atmosphere via passageways 153 and 55, bore 56, past valve seat 150, chamber 57, passageway 151 and past resilient shield 46 of insect excluder device 49.

Moreover, fluid under pressure will now be vented from the chamber 39 below the diaphragm 24 to atmosphere via passageway 55, bore 56, past valve seat 150, chamber 57, passageway 151 and past shield 46. This release of fluid under pressure from the chamber 39 to atmosphere further increases the downwardly acting fluid pressure force on the diaphragm 24 thereby assisting in quickly deflecting the diaphragms 24 and 32 in a downward direction thereby hastening the operation of vent valve device 137 in a manner now to be explained.

Upon the release of fluid under pressure from the chamber 152 to atmosphere in the manner just explained, the fluid under pressure in the passageway 139 and acting on the vent valve 144 outside its seat 58 is rendered effective to shift vent valve guide 143 and vent valve 144 downward to unseat vent valve 144 from its seat 58.

It may be noted that the distance between the lower end of the vent valve pilot valve 141 and the upper end of the vent valve guide 143 is very short. Therefore, if the vent valve 144 is not immediately unseated from its seat 58 by the fluid under pressure in the passageway 139 upon the venting of fluid under pressure from the chamber 152 to atmosphere in the manner described above, the lower end of the pilot valve 141 will abut the upper end of the valve guide 143 so that this pilot valve 141, as it is shifted downward by the stem 25, will mechanically assist in effecting unseating of the vent valve 144 from its seat 58.

When the vent valve 144 is thus unseated from its seat 58, the passageway 139, which is connected to the brake pipe 1, is open to atmosphere via the chamber 57, passageway 151 and past the shield 46. With this communication established, fluid under pressure is suddenly vented from the brake pipe 1 at an emergency rate for the purpose of serially transmitting an emergency rate of reduction of pressure in the train brake pipe extending through the train in the usual well-known manner.

As the diaphragm follower plate 34 is further shifted downward along with the stem 25, this plate 34 abuts the upper end of the stem 82a of the poppet valve 68 and thereafter, via this stem, unseats the corresponding annular valve member 75a from the valve seat 84.

Upon unseating of the annular valve member 75a of the poppet valve 68 from its seat 84, fluid under pressure will flow from the emergency reservoir 3 (FIG. 1B) to the passageway 92 via pipe and passageway 86 (FIGS. 1A and 1B), bore 83 (FIG. 1A), past valve seat 84, chamber 79, passageway 91, bore 90 and around the fluted valve stem 82b of the valve 69 which at this time is seated on valve seat 158 by the spring 157.

The fluid under pressure thus supplied to the passageway 92 from the emergency reservoir 4 combines with that supplied to this passageway 92 from the auxiliary reservoir 4 by operation of the service valve device 11 and flows therefrom to the chamber 120 below the diaphragm 113 of the inshot valve mechanism 110 via the passageway 123, chamber 121, past valve 117 which is at this time held unseated from its seat 118 by spring 111, and bore 119, and also from chamber 121 to chamber 120 via the choke 125.

Fluid under pressure thus supplied to the chamber 120 flows therefrom to a pressure chamber (not shown) within the brake cylinder 2 (FIG. 1B) via the passageway and pipe 122 (FIG. 1A) and also acts on the lower side of the diaphragm 113, it being noted that whenever fluid under pressure is released from the brake pipe 1, fluid under pressure is also released from the chamber 112 above the diaphragm 113 at a rate determined by the size of the choke 114.

The fluid under pressure supplied to the chamber 120 of the inshot valve mechanism 110 in the manner explained above acts on the lower effective area of the diaphragm 113. Consequently, when the pressure in the chamber 120 and in the pressure chamber of the brake cylinder 2 has increased to, for example, fifteen pounds per square inch, which is sufficient to overcome the resistance of spring 111 acting downward on the upper side of the diaphragm 113, this diaphragm 113 will be deflected upward against the yielding resistance of the spring 111 to enable the spring 124 to shift the disc valve 117 upward until it engages the valve seat 118 thereby closing off the rapid flow of fluid under pressure to the brake cylinder 2 by way of the bore 119. With the valve 117 thus seated on valve seat 118, fluid under pressure continues to flow from the passageway 123 to the brake cylinder 2 (FIG. 1B) via the chamber 121, choke 125 (FIG. 1A), chamber 120 and passageway and pipe 122, the choke 125 forming a by-pass communication around the valve 117, which is now seated on the valve seat 118. The choke 125 provides for the second stage of increase in brake cylinder pressure at a slower rate. The pressure in the brake cylinder 2 will now continue to build up at this slower rate determined by the size of the choke 125 until equalization of the pressures in the auxiliary reservoir 4, emergency reservoir 3 and brake cylinder 2 occurs.

From the foregoing, it is apparent that the emergency valve device 12 of the brake control valve device 5 provides a two-stage buildup of pressure in the brake cylinder 2.

Since fluid under pressure is supplied from both the auxiliary reservoir 4 and the emergency reservoir 3 to the brake cylinder 2 when an emergency brake application is effected, it is apparent that a higher pressure is obtained in the brake cylinder 2 than is the case when a service application is effected.

When all fluid under pressure is released from the quick action chamber 52 (FIG. 1B) and chamber 53 (FIG. 1A) above the diaphragm 32 via the choke 127, it being remembered that all fluid under pressure has been vented from the chamber 39 below the diaphragm 24 in the manner hereinbefore explained, the inherent resiliency of the diaphragms 24 and 32 will return these diaphragms and the valve stem 25 to the position shown in FIG. 1A. The spring 76 will now seat annular member 75 of poppet valve 67 on its seat 74, the spring 85 will seat annular member 75a of poppet valve 68 on its seat 84, the spring 149 will seat annular member 142 of vent valve pilot valve 141 on its seat 150 thereby establishing a communication between passageways 59 and 55, and the spring 146 will seat vent valve 144 on its seat 58. It should be understood that the diameter of the choke 127, which as aforestated is 0.0200 inch, is such that the pressure in the chamber 38 above the diaphragm 24 is not reduced sufficiently for the diaphragms 24 and 32 to return to the position in which they are shown in FIG. 1A to permit reseating of vent valve pilot valve 141 and vent valve 144 prior to the train being brought to a complete stop as the result of the emergency brake application.

RELEASE OF THE BRAKES AFTER AN EMERGENCY APPLICATION

To effect a release of the brakes after an emergency application, fluid under pressure is supplied to the brake pipe 1 from whence it flows to the chamber 39 (FIG. 1A) below the diaphragm 24 in the emergency valve device 12 and the chamber 63 via the choke 64 in this valve device 12.

Moreover, fluid under pressure flows from the brake pipe 1 to the chamber 16 (FIG. 1B) above the diaphragm 15 in the service valve device 11 at a restricted rate determined by the size of a choke 159.

It will be noted from FIGS. 1A and 1B of the drawings that fluid under pressure flows at an unrestricted rate to the chamber 39 in the emergency valve device 12 since there are no chokes in the passageways 55 and 59.

Furthermore, it will be noted from FIG. 1A that the choke 64 restricts the rate of flow of fluid under pressure from the passageway 62 to the chamber 53 above the diaphragm 32 and the quick action chamber 52 via passageways 65 and 66. Accordingly, it is apparent that the pressure in the chamber 39 below the diaphragm 24 will increase more rapidly than will the pressure in the chamber 53 above the diaphragm 32.

Therefore, it will be understood that the more rapid rate of increase of pressure in the chamber 39 quickly establishes a fluid pressure differential force which is effective to deflect the diaphragms 24 and 32 in an upward direction, as viewed in FIG. 1A.

Moreover, it is apparent that this upward deflection of the diaphragms 24 and 32 is effective to shift the valve stem 25, diaphragm follower plates 26, 27, 34 and 35, and piston 134 in an upward direction against the yielding resistance of the spring 136 until the diaphragm follower plate 35 abuts a stop surface 160 on the lower side of cover member 33.

As the diaphragm followr plate 27 is moved upward by the upward deflection of the diaphragms 24 and 32, subsequent to the seating of the annular valve members 75a of the poppet valves 67 and 68 on their respective valve seats 74 and 84 in the manner described above, this follower plate 27 will first abut the lower end of the valve stem 82b of the poppet valve 69 and thereafter lift the annular valve member 75b of of this valve 69 from its seat 158 against the yielding resistance of the spring 157.

Fluid under pressure will now flow from the brake cylinder 2 (FIG. 1B) and the auxiliary reservoir 4 connected thereto to the brake pipe 1 via the service valve device 11, which is still in its service application position, via pipe and passageway 122, chamber 120 (FIG. 1A), bore 119, past valve 117 which is unseated from its seat 118 upon the pressure in the chamber 121 becoming less than that in the chamber 120, this chamber 121, passageways 123 and 92, bore 90, past unseated valve 69, chamber 87, passageway 95, past valve 97 which is unseated from its seat 96, chamber 99, passageways 100 and 59, chamber 60 (FIG. 1A) passageway 61, a strainer device 161, a passageway 162 in the pipe bracket 8, combined cut-out cock and dirt collector 6 and branch pipe 7.

The above-mentioned flow of fluid under pressure from the brake cylinder 2 and auxiliary reservoir 4 to the brake pipe 1 accelerates the rate of recharge of the brake pipe. This action naturally occurs first at the head end of the train when the increase in brake pipe pressure is first effected, and the sudden increase in brake pipe pressure on one car causes the emergency valve device on the next car to function in the same manner, so that this back dump operation is rapidly transmitted serially from car to car throughout the length of the train.

It will be noted from FIG. 1A that some of the fluid under pressure supplied from the brake cylinder 2 and auxiliary reservoir 4 to the passageway 59, in the manner described above, flows from this passageway 59 to the chamber 53 above the diaphragm 32 via the passageway 62, choke 64, chamber 63 and passageway 65.

Moreover, fluid under pressure thus supplied to the chamber 63 flows therefrom to the quick action chamber 52 (FIG. 1B) via the passageway 66.

From the foregoing, it is apparent that fluid under pressure will flow from the brake cylinder 2 and auxiliary reservoir 4 to the brake pipe 1 until substantial equalization of pressures therebetween occurs, and also that fluid under pressure will flow through the choke 64 until the pressure in the chamber 53 and quick action chamber 52 is substantially the same as the pressure in the chamber 39 and the brake pipe 1.

As the pressure in the chamber 53 above the diaphragm 32 is increased by flow of fluid under pressure to this chamber through the choke 64, the differential fluid pressure force acting upward on the diaphragms 24 and 32 is correspondingly reduced. Therefore, as this differential fluid pressure force is thus reduced, the spring 136 is rendered effective via the piston 134 to shift the valve stem 25 and diaphragm follower plates 26, 27, 34 and 35 downward until the piston 134 abuts the shoulder 135.

Upon equalization of pressure in chambers 53 and 39, the inherent resilience of the diaphragms 32 and 24 return these diaphragms, the stem 25 and the diaphragm follower plates 26, 27, 34 and 35 to the position in which they are shown in FIG. 1A.

As the diaphragm follower plate 27 is thus moved downward to the position in which it is shown in FIG. 1A, the spring 157 is rendered effective to seat annular valve member 75b of the poppet-type valve 69 on its seat 158 thereby closing communication between the brake cylinder 2 (FIG. 1B) and the brake pipe 1 thus preventing further flow of fluid under pressure from the brake cylinder 2 to the brake pipe 1.

As fluid under pressure is supplied to the chamber 16 (FIG. 1B) in the manner described above, the resulting increase in pressure in this chamber 16 will deflect the diaphragm 15 downward to thereby return the graduating valve 19 and the service valve 20 of the service valve device 11 to the position shown. The fluid under pressure now remaining in the brake cylinder 2 will flow to atmosphere via pipe and passageway 122, chamber 120, bore 119, past valve seat 118, choke 125 in parallel therewith, chamber 121, passageways 123, and 92, and passageways and ports in the service valve device 11, it being understood that these passageways and ports correspond to ports and passageways in the service valve device 7 of the brake control valve device 1 shown in hereinbefore-mentioned U.S. Pat. No. 3,232,678 through which fluid under pressure may flow from the brake cylinder 7 shown in this patent to atmosphere.

With the release of all fluid under pressure from the brake cylinder 2 (FIG. 1A), the brakes on the car will be completely released.

Furthermore, the emergency reservoir 3 and the auxiliary reservoir 4 will now be charged from the brake pipe 1 to the normal fully charged train brake pipe pressure.

DESCRIPTION — FIG. 2

According to a second embodiment of the invention, a novel emergency valve device 163 shown in FIG. 2 differs from the emergency valve device 12 shown in FIG. 1A in that the vent valve pilot valve 141 shown in FIG. 1A for releasing fluid under pressure from the chamber 39 below the diaphragm 24 and from the chamber 152 below the vent valve 144 to atmosphere is omitted, and a poppet-type valve 164 is provided for releasing fluid under pressure from the chamber 39 to atmosphere.

Furthermore, the valve stem 25 shown in FIG. 1A is replaced by a valve stem 165 that is of sufficient length to effect mechanical unseating of the vent valve 144 from its seat 58 when an emergency brake application is effected.

It should be understood that the emergency valve device 163 comprises, in addition to the poppet-type valve 164 shown in FIG. 2, the poppet-type valves 67, 68 and 69. chokes 51 and 127, and all of the other elements of the emergency valve device 12 shown in FIG. 1A even though these elements are not shown in FIG. 2 which constitutes a partial diagrammatic view of this emergency valve device 163. Accordingly, like reference numerals have been used to designate the structure shown in FIG. 2 which is identical to that shown in FIG. 1. Only such features of the structure and operation of the embodiment of the invention shown in FIG. 2 which differ from that of the embodiment of FIG. 1A will be hereinafter described.

As shown in FIG. 2, the valve stem 165 extends through the bore 30 and is operatively connected to the diaphragms 24 and 32 in the same manner as the valve stem 25 shown in FIG. 1A.

Furthermore, the valve stem 165 is provided with the bottomed bore 41, crossbores 40 and 43, elongated peripheral annular groove 44, a peripheral annular groove in which is disposed the O-ring seal 156, and the plug 42 that closes the lower end of the bottomed bore 41, it being noted that the length of this bottomed bore 41 in stem 165 is longer than in stem 25.

As shown in FIG. 2, the poppet-type valve 164 is disposed in a chamber 166 formed in the casing section 22 and always open to atmosphere via a passageway 167 extending through this casing section to the exterior thereof.

The poppet valve 164 has formed integral with one side thereof a fluted valve stem 168 that extends through a bore 169 provided therefor in the casing section 22 and connecting the chambers 166 and 31, it being noted that an annular valve seat 170 surrounds the lower end of this bore 169.

A resilient annular member 75c is disposed about the stem 168 and bonded to the upper side of the poppet valve 164, and a spring 171, interposed between a screw-threaded plug 172 that has screw-threaded engagement with screw threads provided therefor in the casing section 22 and the lower side of this poppet valve 164, is effective to normally bias the annular member 75c against the valve seat 170 to close communication between the chamber 166 and the interior of the bore 169 at the wall surface of which opens one end of a passageway 173. This passageway 173 extends through the casing sections 22 and 23 and at its other end opens into the chamber 39 below the diaphragm 24.

As shown in FIG. 2, the passageway 59 in the casing section 23 opens into the chamber 39 rather into the bore 56 as is the case in the emergency valve device 12 shown in FIG. 1A.

Furthermore, as shown in FIG. 2, the vent valve guide 143 shown in FIG. 1A is replaced by a vent valve guide 174 to which the vent valve 144 is secured by the snap ring 145. The spring 146 interposed between the cover member 147 and the vent valve guide 174 is normally effective to bias the vent valve 144 against its seat 58.

OPERATION — FIG. 2

When the emergency valve device 12 shown in FIG. 1A is replaced by the emergency valve device 163 shown in FIG. 2, the operation of the brake control valve device 5 in charging, service application, and service lap is the same as hereinbefore described for the first embodiment of the invention. However, operation, when an emergency brake application is effected, is somewhat different. Therefore, operation of the brake control valve device 5, when the emergency valve device 12 is replaced by the emergency valve device 163, at the time an emergency brake application is effected will now be described.

EMERGENCY APPLICATION

The operation of the service valve device 11 in response to the release of fluid under pressure from the brake pipe 1 at an emergency rate is the same as in the first embodiment of the invention.

Considering now the emergency valve device 163, the rate of release of fluid under pressure from the chamber 53 above the diaphragm 32 to atmosphere via the choke 51 (FIG. 1A) is less than the emergency rate of release of fluid under pressure from the chamber 39 below the diaphragm 24 via the passageway 59 and brake pipe 1 for the same reason as explained in connection with the first embodiment of the invention.

Therefore, a differential of pressure is quickly established on the diaphragms 32 and 24 which deflects them downward to shift the diaphragm follower plates 26, 27, 34 and 35 and the valve stem 165 downward far enough for the diaphragm follower plate 34 to first abut the upper end of valve stem 168 and thereafter, via this stem, effect unseating of the annular member 75c of the poppet valve 164 from its seat 170.

Likewise, the plug 42 carried in the lower end of the valve stem 165 first abuts the upper end of the vent valve guide 174 and thereafter mechanically effects unseating of the vent valve 144 from its seat 58. The respective lengths of the valve stems 168 and 165 are such that the annular member 75c of poppet-type valve 164 is unseated from its seat 170 substantially simultaneously as the vent valve 144 is unseated from its seat 58.

Upon the unseating of the annular member 75c of the poppet valve 164 from its seat 170, fluid under pressure will be vented from the chamber 39 below diaphragm 24 to atmosphere via passageway 173, bore 169, past valve seat 170, chamber 166 and passageway 167.

Likewise, upon the unseating of the vent valve 144 from its seat 58, the passageway 139, which is connected to the brake pipe 1, is open to atmosphere via the chamber 57, passageway 151 and past the shield 46 (FIG. 1A). With this communication established, fluid under pressure is suddenly vented from the brake pipe 1 at an emergency rate for the purpose of serially transmitting an emergency rate of reduction of pressure in the train brake pipe extending through the train the same as in the first embodiment of the invention.

The emergency valve device 163 operates in the same manner as hereinbefore described for the emergency valve device 12 to effect the supply of fluid under pressure from the emergency reservoir 4 (FIG. 1B) to the brake cylinder 2 when an emergency brake application is effected.

As is the case in the first embodiment of the invention, when all fluid under pressure is vented from the quick action chamber 52 (FIG. 1B) and chamber 53 above the diaphragm 32 of the emergency valve device 163 (FIG. 2), the inherent resiliency of the diaphragms 24 and 32 will return these diaphragms and the stem 165 to the position shown in FIG. 2. The spring 171 will now seat annular valve member 75c of poppet valve 164 on its seat 170.

Likewise, the valve member 75 of the poppet valve 67 (FIG. 1A) will be seated on its seat 74 by the spring 76, and the vent valve 144 (FIG. 2) will be seated on its seat 58 by the spring 146.

RELEASE OF THE BRAKES AFTER AN EMERGENCY APPLICATION

To effect a release of the brakes subsequent to an emergency application, fluid under pressure is supplied to the brake pipe 1 from whence it flows to the chamber 39 (FIG. 2) below the diaphragm 24 via the passageway 59.

Moreover, fluid under pressure flows to the quick action chamber 52, the chamber 16 above the diaphragm 15 in the service valve device 11 and the chamber 53 (FIG. 2) above the diaphragm 32 in the same manner as described in connection with the first embodiment of the invention.

The emergency valve device 163 (FIG. 2) and the service valve device 11 (FIG. 1B) now operate in the same manner as described for the first embodiment of the invention to effect a release of an emergency brake application and the recharge of the emergency reservoir 3 and the auxiliary reservoir 4 to the normal fully charged train brake pipe pressure.

Having now described the invention, what I claim as new and desire to secure by Letters Patent, is:

1. For use in a brake apparatus including a brake pipe, an auxiliary reservoir and an emergency reservoir each normally charged to a certain chosen pressure, a brake cylinder and a fluid-pressure-operated service valve device, a fluid-pressure-operated emergency valve device operative in conjunction with said service valve device in response to a reduction of the pressure in the brake pipe at an emergency rate to effect the supply of fluid under pressure from said reservoirs to said brake cylinder to cause an emergency brake application, said emergency valve device comprising:

(a) a casing having therein a plurality of chambers, bores and passageways, each bore connecting at least two of said chambers and certain of said bores having formed at one end an annular valve seat and four of said passageways respectively opening at one end into four of said bores and having the other end connected respectively to the emergency reservoir, the brake cylinder, the brake pipe and another chamber other than one of said plurality of chambers, (b) a plurality of poppet-type valves each having a fluted stem slidably mounted in one of said bores whereby the respective valve cooperates with the annular valves seat at the one end of the corresponding bore to control flow of fluid under pressure between one of said passageways and one of said chambers, (c) a pair of spaced-apart movable abutments subject on one side respectively to the pressure in the brake pipe and in said another chamber, and on the other side to fluid pressure in an atmospheric chamber formed by the respective abutment and the casing, the deflection of said pair of abutments in one direction responsive to a reduction of the pressure in the brake pipe being effective to cause one of said abutments to operate a certain one of said poppet-type valves to effect a release of fluid under pressure from said another chamber through said certain one of said poppet-type valves directly, only to said atmospheric chamber and another of said poppet-type valves to effect the supply of fluid under pressure from the emergency reservoir to the brake cylinder, and the deflection of said pair of abutments in an opposite direction responsive to a subsequent increase of the pressure in the brake pipe being effective to cause the other of said abutments to operate still another of said poppet-type valves to effect the supply of fluid under pressure from the brake cylinder to the brake pipe, (d) a first vent passageway between another one of said bores and atmosphere, (e) a hollow stem interconnecting said pair of abutments and forming a central passageway via which fluid pressure in said atmospheric chamber is communicated with said first vent passageway, said stem being slidably mounted in said another one of said bores and including valve means for controlling said communication in accordance with deflection of said abutments, and (f) a first choke in said first vent passageway via which the fluid pressure in said another chamber is vented to atmosphere at a certain chosen rate by said valve means when said certain one of said poppet-type valves is operated.

2. A fluid-pressure-operated emergency valve device, as recited in claim 1, further characterized in that each of said poppet-type valve comprises a resilient annular valve member disposed in surrounding relation to the fluted stem thereof for engagement with the corresponding annular valve seat, each resilient annular valve member being identical and interchangeable with each of the other resilient annular valve members.

3. A fluid-pressure operated emergency valve device, as recited in claim 1, further characterized by an inshot valve mechanism for providing a two-stage buildup of pressure in the brake cylinder.

4. A fluid-pressure-operated emergency valve device, as recited in claim 1, further comprising:

(a) a brake pipe vent valve for releasing fluid under pressure from the brake pipe at an emergency rate, and (b) means operated by said hollow stem to cause operation of said brake pipe vent valve.

5. A fluid-pressure-operated emergency valve device, as recited in claim 4, further characterized in that said certain chosen rate by which fluid pressure in said another chamber is vented to atmosphere is such as to counteract said deflection of said abutments in response to a service reduction of brake pipe pressure thereat prior to operation of said another of said poppet-type valves by said abutment and prior to operation of said means for causing operation of said brake pipe vent valve by said hollow stem.

6. A fluid-pressure-operated emergency valve device, as recited in claim 4, further characterized in that said certain chosen rate by which fluid pressure in said another chamber is vented to atmosphere is such as to counteract said deflection of said abutments in response to a service reduction of brake pipe pressure thereat prior to operation of said another of said poppet-type valves by said abutment and prior to engagement of said brake pipe vent valve by said hollow stem.

7. A fluid-pressure-operated emergency valve device, as recited in claim 1, further comprising a brake pipe vent valve mechanically operated by direct engagement of therewith said hollow stem to effect the release of fluid under pressure from the brake pipe at an emergency rate.

8. A fluid-pressure-operated emergency valve device, as recited in claim 1, further characterized in that a fourth one of said poppet-type valves is operative by said one abutment upon the deflection of said pair of abutments in said one direction to cause the release to atmosphere of fluid under pressure from that one of said abutments that is subject to the pressure in the brake pipe.

9. A fluid-pressure-operated emergency valve device, as recited in claim 1, further characterized by a fluid-pressure-operated brake pipe vent valve for releasing fluid under pressure from the brake pipe to atmosphere at an emergency rate, and in that a fourth one of said poppet-type valves is operative by said hollow stem to cause said brake pipe vent valve to be operated by the pressure in the brake pipe to effect the release of fluid under pressure from the brake pipe at an emergency rate.

10. A fluid-pressure-operated emergency valve device, as recited in claim 9, further characterized in that said brake pipe vent valve is so arranged as to be normally subject on its respective opposite sides to the pressure in said brake pipe, and said fourth one of said poppet-type valves is so constructed and arranged as to be effective, upon operation by said hollow stem, to cause the release of fluid under pressure from one side of said brake pipe vent valve to enable the pressure in said brake pipe acting on the other side to so operate said brake pipe vent valve as to release fluid under pressure from the brake pipe to atmosphere at an emergency rate, and transmit a force to said brake pipe vent valve whereby said force mechanically assists the fluid pressure force of the fluid under pressure in said brake pipe to operate said brake pipe vent valve to release fluid under pressure from said brake pipe.

11. A fluid-pressure-operated emergency valve device, as recited in claim 1, further comprising:
 (a) a brake pipe vent valve,
 (b) a valve seat for said vent valve,
 (c) biasing means for normally biasing said vent valve against said seat to close communication between the brake pipe and atmosphere, and
 (d) valve means simultaneously enabling the subjection of said brake pipe vent valve to the pressure in the brake pipe so that said brake pipe pressure assists said biasing means in biasing said vent valve against said seat and the subjection of one of said pair of abutments to the pressure in the brake pipe, said valve means being so disposed and arranged as to be operated by said hollow stem to cut off the supply of fluid under pressure from the brake pipe to said brake pipe vent valve and also said one abutment and effect the release of fluid under pressure from each to atmosphere.

12. A fluid-pressure-operated emergency valve device, as recited in claim 1, further comprising:
 (a) a second vent passageway communicating said atmospheric chamber with atmosphere in bypass of said control passage in said hollow stem, and
 (b) a second choke in said second vent passageway via which the fluid pressure in said atmospheric chamber is vented at a rate less than said certain chosen rate.

13. A fluid-pressure-operated emergency valve device, as recited in claim 12, further characterized in that the venting of said fluid under pressure released from said another chamber to atmosphere at said chosen rate is via said hollow stem in response to a first chosen degree of deflection of said pair of abutments in said one direction, and the venting of said fluid under pressure released from said another chamber to atmosphere at said rate that is less than said chosen rate and independently of said hollow stem is in response to a second chosen degree of deflection of said pair of abutments in said one direction that is in excess of said first chosen degree of deflection.

14. A fluid-pressure-operated emergency valve device, as recited in claim 12, wherein said valve means interrupts said communication in accordance with deflection of said abutments responsive to the brake pipe reduction exceeding said service rate whereby the fluid pressure in said another chamber is vented via said second choke at a rate less than said certain chosen rate.

* * * * *